(12) United States Patent
Landreth

(10) Patent No.: US 9,150,064 B1
(45) Date of Patent: Oct. 6, 2015

(54) SCOOTER AND CART CONNECTION DEVICE

(71) Applicant: Ronnie Landreth, Grand Prairie, TX (US)

(72) Inventor: Ronnie Landreth, Grand Prairie, TX (US)

( * ) Notice: Subject to any disclaimer, the term of this patent is extended or adjusted under 35 U.S.C. 154(b) by 0 days.

(21) Appl. No.: 14/259,645

(22) Filed: Apr. 23, 2014

(51) Int. Cl.
*B60D 1/18* (2006.01)
*B60D 1/02* (2006.01)
*B60D 1/24* (2006.01)

(52) U.S. Cl.
CPC . *B60D 1/025* (2013.01); *B60D 1/24* (2013.01)

(58) Field of Classification Search
CPC ........... B60D 1/18; B60D 1/182; B60D 1/187
See application file for complete search history.

(56) References Cited

U.S. PATENT DOCUMENTS

| | | | | |
|---|---|---|---|---|
| 1,485,888 | A * | 3/1924 | Schonberg | 280/480 |
| 1,771,082 | A * | 7/1930 | Gignac | 280/480.1 |
| 1,985,468 | A * | 12/1934 | Strang | 280/480 |
| 4,305,601 | A | 12/1981 | Berge | |
| 4,718,690 | A * | 1/1988 | Baker | 280/480 |
| 5,769,440 | A | 6/1998 | Jones | |
| 5,794,957 | A | 8/1998 | Mendon | |
| 5,813,582 | A | 9/1998 | Wright | |
| 6,027,001 | A * | 2/2000 | Levitan | 224/184 |
| 6,050,587 | A * | 4/2000 | Panhausen | 280/480 |
| 6,186,528 | B1 | 2/2001 | Walker, Sr. et al. | |
| 6,702,313 | B2 | 3/2004 | Forshee et al. | |
| D504,933 | S | 5/2005 | Hopwood | |
| 2003/0132607 | A1* | 7/2003 | Pan | 280/491.5 |
| 2011/0109062 | A1* | 5/2011 | Fincher et al. | 280/480 |
| 2012/0090904 | A1 | 4/2012 | Bezile | |
| 2013/0285351 | A1 | 10/2013 | Conrad | |

FOREIGN PATENT DOCUMENTS

WO WO8401335 4/1984

* cited by examiner

*Primary Examiner* — Kevin Hurley

(57) ABSTRACT

A scooter and cart connection device allows connection of a shopping cart to a personal scooter to facilitate shopping. The device includes a conduit having a first opening, a second opening, and a medial opening. A cord extends through the conduit with a first end extending from the first opening and a second end extending from the second opening. A medial section of the cord extends from the medial opening defining a loop. A pin is positionable to extend through the loop wherein the cord is coupled to a connector extending from a scooter. Each of a pair of hooks is coupled to an associated one of the first end and the second end of the cord for coupling to a basket of a cart.

10 Claims, 6 Drawing Sheets though numerous characteristics of the disclosure have been set forth in the foregoing description, together with details of the structure and function of the disclosure, the disclosure is illustrative only, and changes may be made in detail, especially in matters of shape, size and arrangement of parts within the principles of the disclosure to the full extent indicated by the broad general meaning of the terms in which the appended claims are expressed.

SCOOTER AND CART CONNECTION DEVICE

BACKGROUND OF THE DISCLOSURE

Field of the Disclosure

The disclosure relates to connection devices and more particularly pertains to a new connection device for allowing connection of a shopping cart to a personal scooter to facilitate shopping.

SUMMARY OF THE DISCLOSURE

An embodiment of the disclosure meets the needs presented above by generally comprising a conduit having a first opening, a second opening, and a medial opening. A cord extends through the conduit with a first end extending from the first opening and a second end extending from the second opening. A medial section of the cord extends from the medial opening defining a loop. A pin is positionable to extend through the loop wherein the cord is coupled to a connector extending from a scooter. Each of a pair of hooks is coupled to an associated one of the first end and the second end of the cord for coupling to a basket of a cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
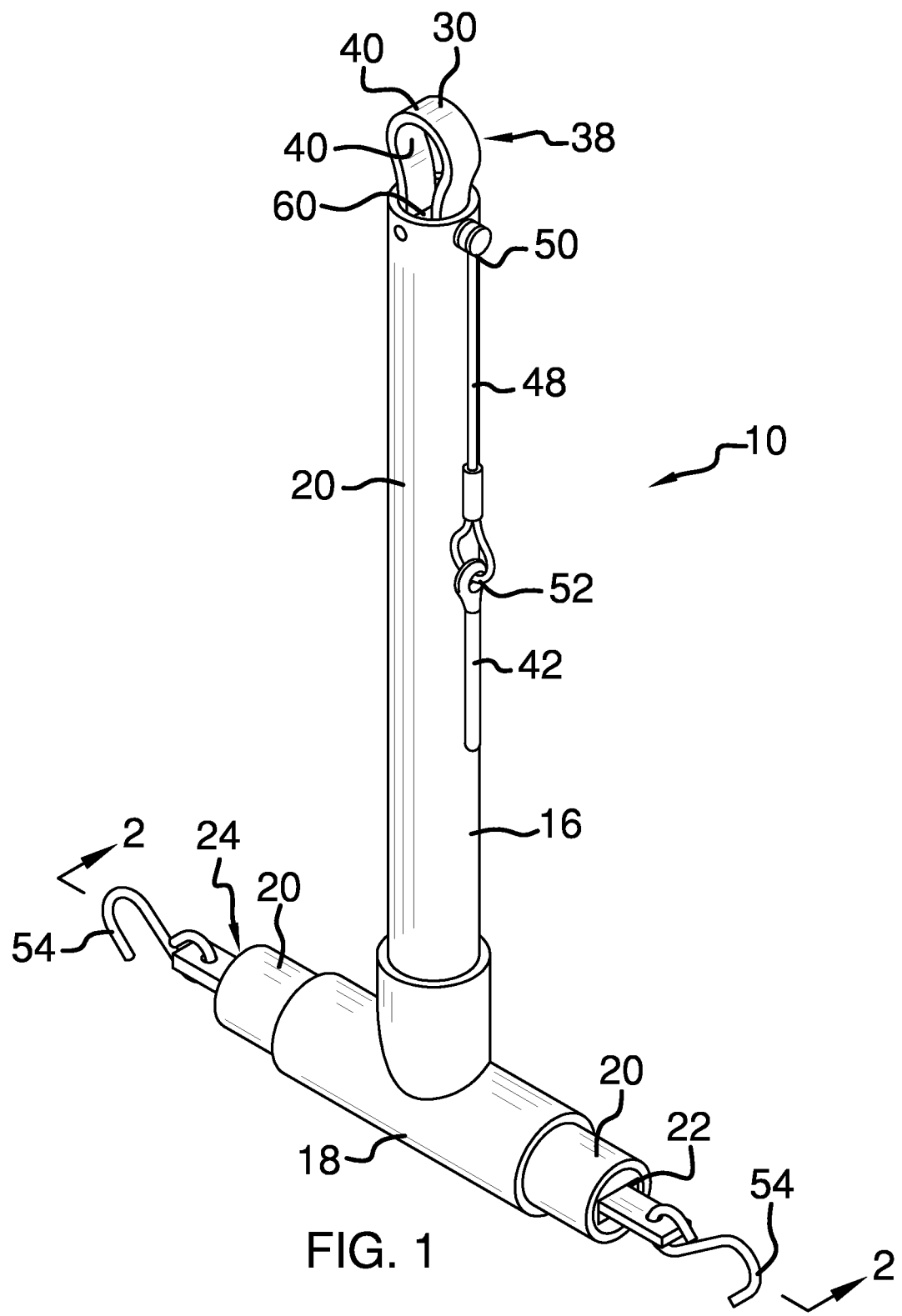
FIG. 1 is a top front side perspective view of a scooter and cart connection device according to an embodiment of the disclosure.
Figure 2:
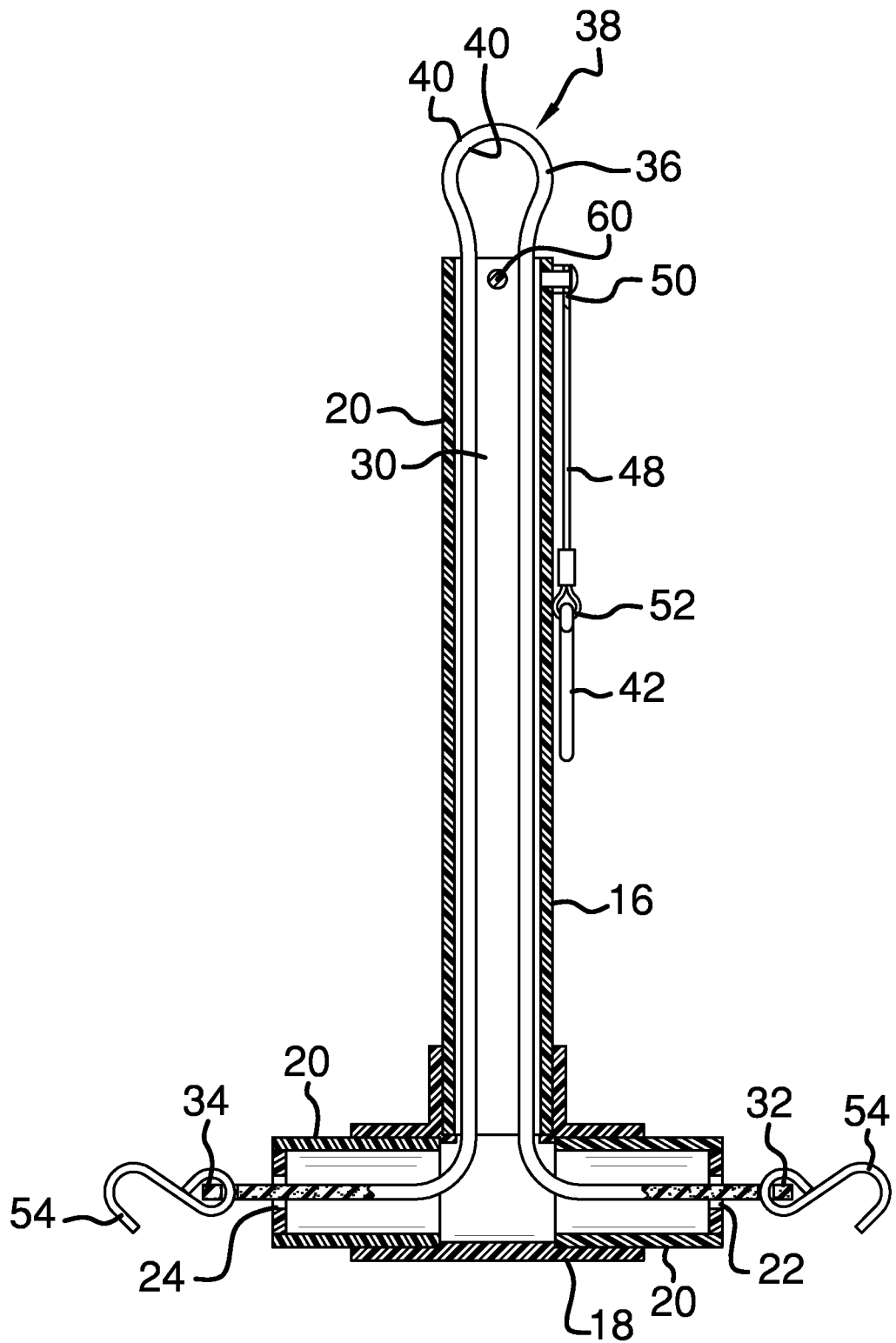
FIG. 2 is a cross-sectional view of an embodiment of the disclosure taken along line 2-2 of FIG. 1.
Figure 3:
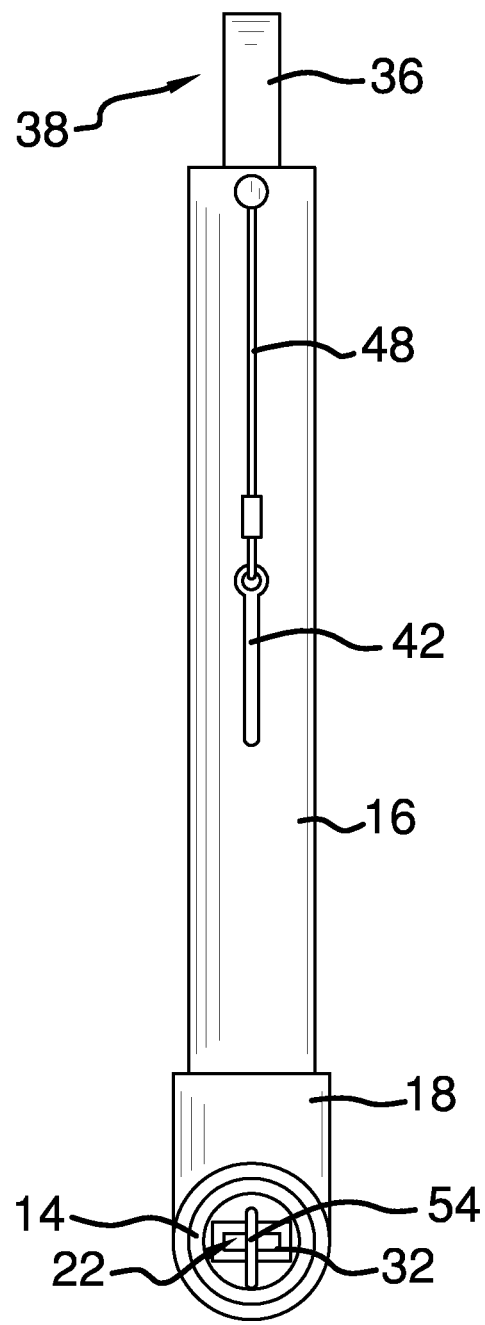
FIG. 3 is a side view of an embodiment of the disclosure.
Figure 4:
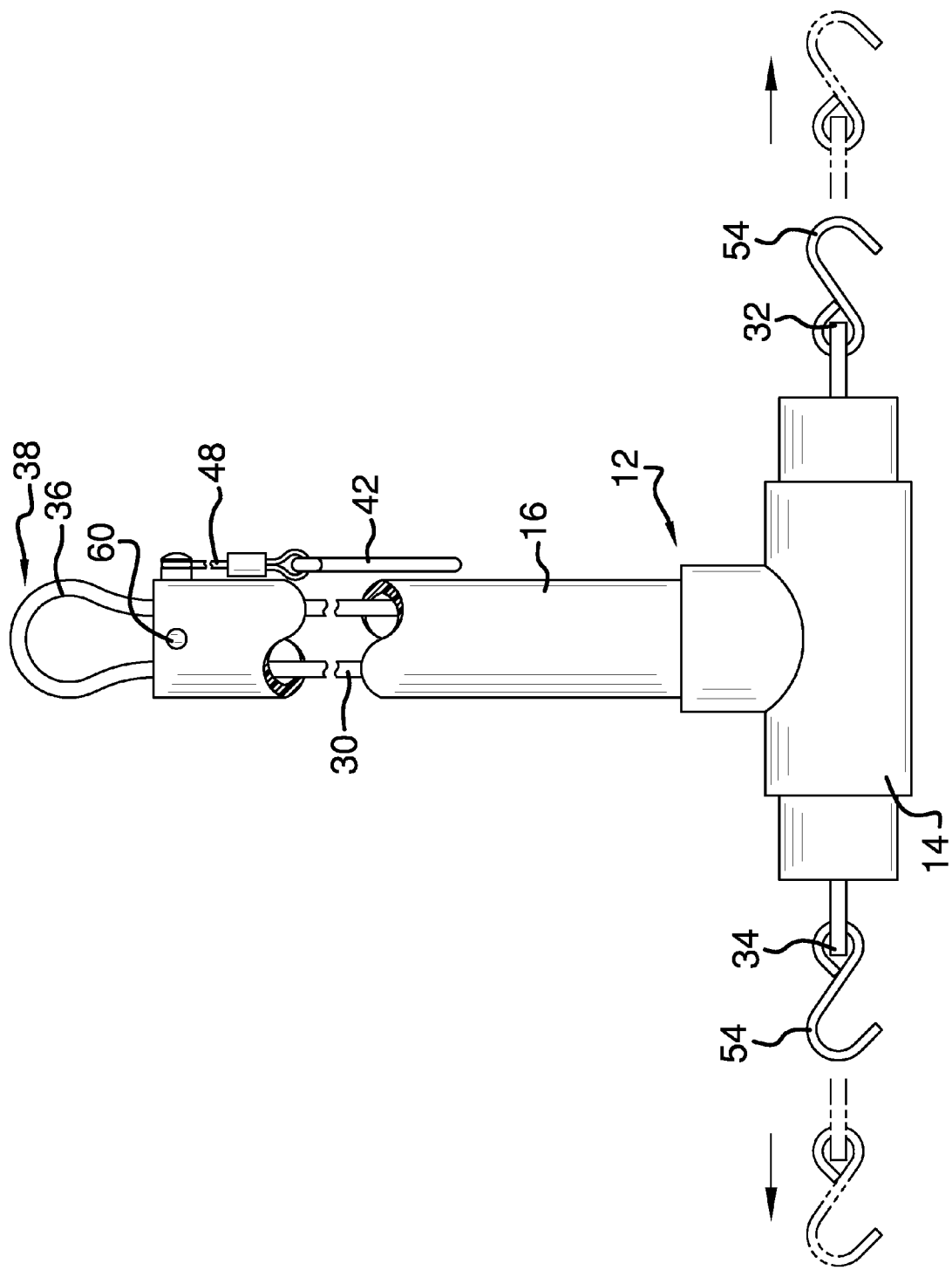
FIG. 4 is a top view of an embodiment of the disclosure.
Figure 5:
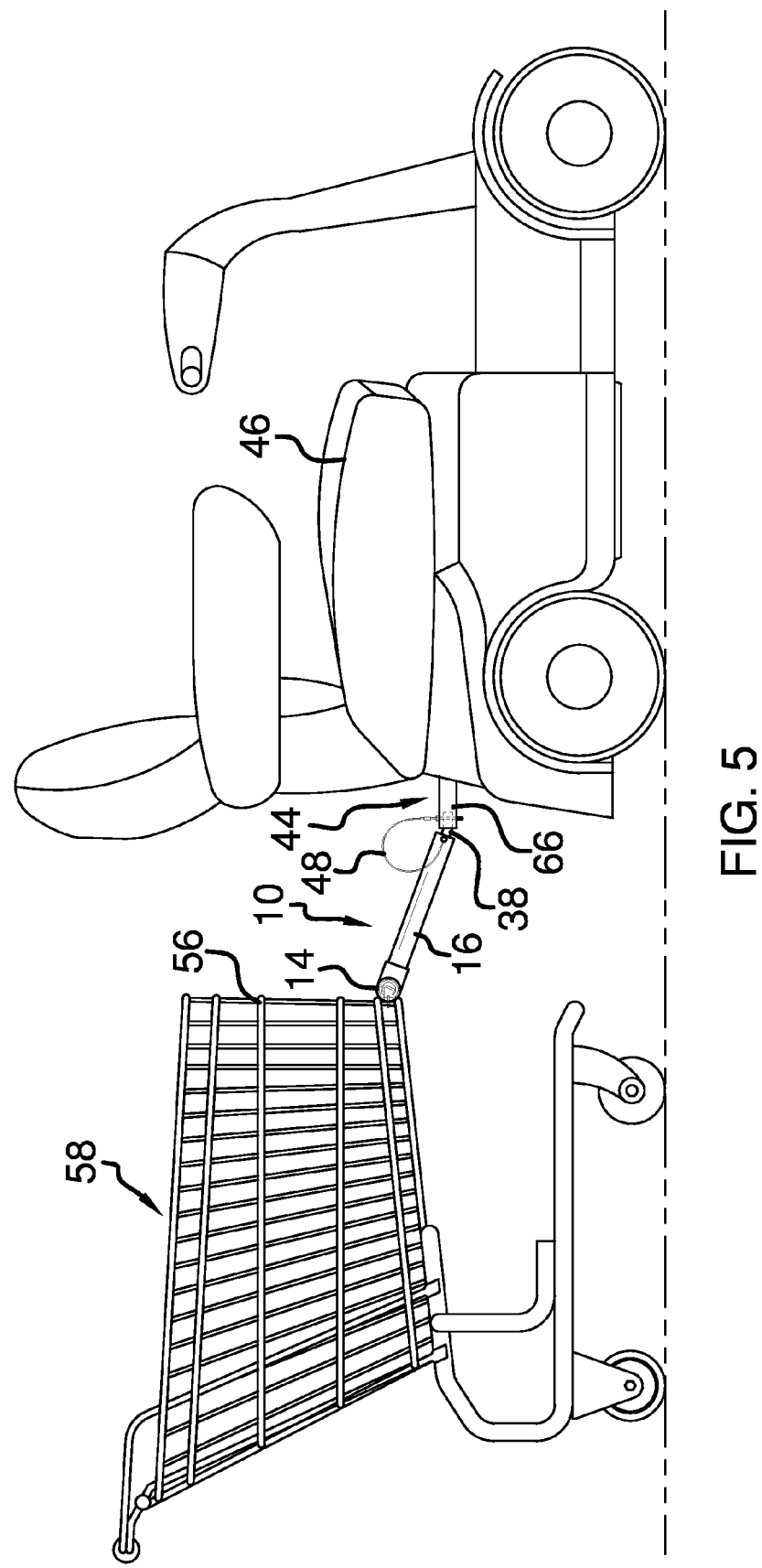
FIG. 5 is a side view of an embodiment of the disclosure in use.

With reference now to the drawings, and in particular to FIGS. 1 through 6 thereof, a new connection device embodying the principles and concepts of an embodiment of the disclosure and generally designated by the reference numeral 10 will be described.

As best illustrated in FIGS. 1 through 6, the scooter and cart connection device 10 generally comprises a conduit 12 having a straight section 14 and an extension section 16. The extension section 16 is transverse relative to the straight section 14. The extension section 16 is straight such that the conduit 12 is substantially T-shaped. The conduit 12 may be constructed of a T-shaped joint 18 and a plurality of straight tubes 20. The conduit 12 may be constructed of polyvinyl chloride or the like. The conduit 12 has a first opening 22, a second opening 24, and a medial opening 26. The first opening 22 is aligned with the second opening 24. The medial opening 26 is transverse relative to the first opening 22 and the second opening 24. The medial opening 26 is positioned at a distal end 28 of the extension section 16 relative to the straight section 14. The extension section 16 is centrally positioned between the first opening 22 and the second opening 24.

Figure 6:
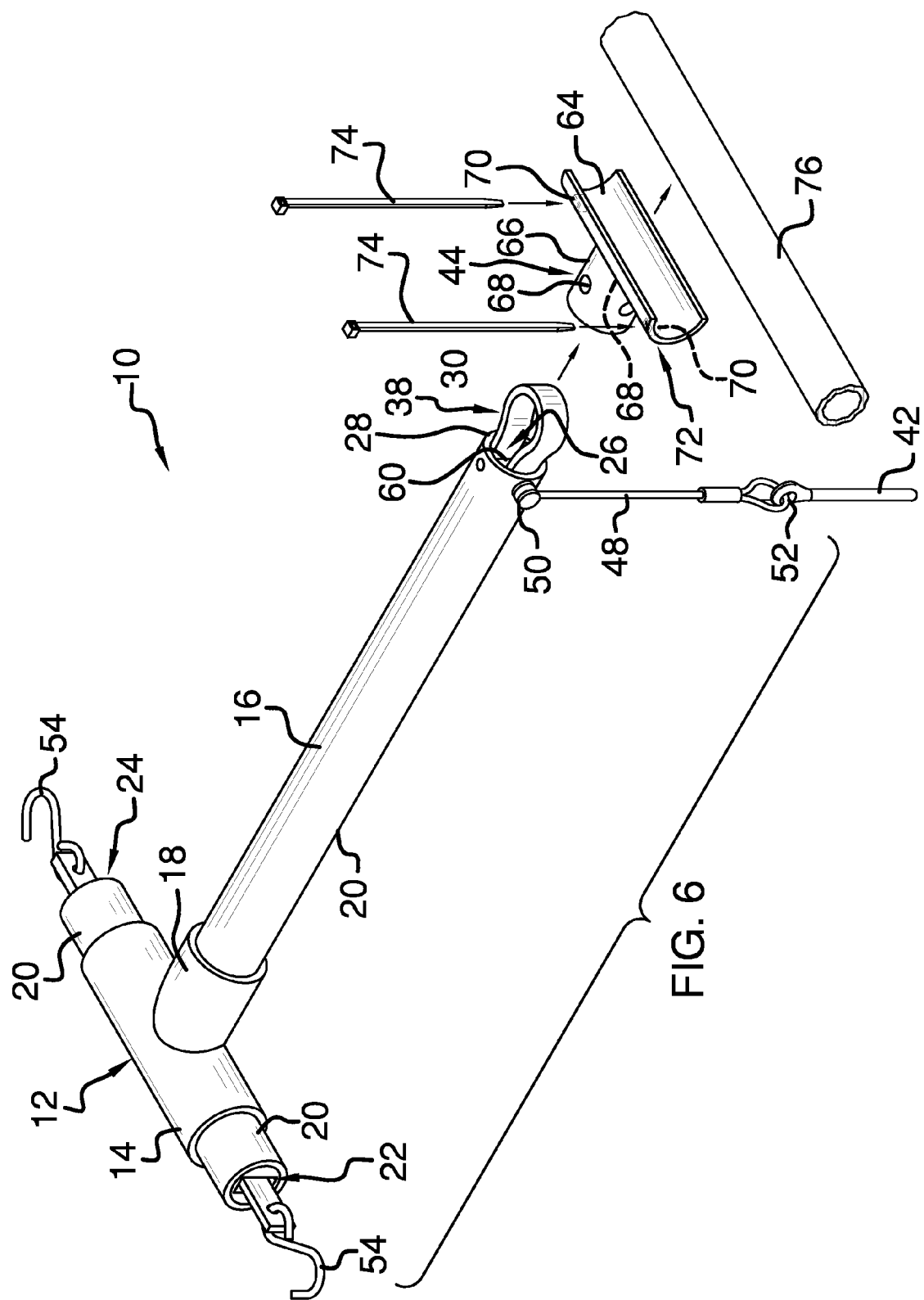
FIG. 6 is a partially exploded top front side perspective view of an embodiment of the disclosure.

A cord 30 extends through the conduit 12. The cord 30 has a first end 32 extending from the first opening 22 and a second end 34 extending from the second opening 24. A medial section 36 of the cord 30 extends from the medial opening 26 defining a loop 38. The cord 30 is resilient along a length of the cord 30. The cord 30 has a pair of parallel flat surfaces 40. A pin 42 is coupled to the conduit 12. The pin 42 is positionable to extend through the loop 38 wherein the cord 30 is configured for being coupled to a connector 44 or scooter hitch extending from a scooter 46. The connector 44 has an arcuate section 64 and an extension 66. A pair of aligned holes 68 extend through the extension 66 to receive the pin 42 when the loop 38 is positioned in the extension 66. As shown, the extension 66 is tubular and may be constructed of polyvinyl chloride materials. The extension 66 may also be opposed parallel flanges. A pair of channels 70 are coupled to the connector 44 and are shown in FIG. 6 to be on a convex surface 72 of the arcuate section 64. Tie lines 74 may be used to secure the arcuate section 64 to a pipe 76 on the scooter. A tether 48 has a first end 50 coupled to the conduit 12 proximate the medial opening 26. The tether 48 has a second end 52 coupled to the pin 42. Each of a pair of hooks 54 is coupled to an associated one of the first end 32 of the cord 30 and the second end 34 of the cord 30. Thus, the first end 32 of the cord 30 and the second end 34 of the cord 30 are each configured for being coupled to a basket 56 of a cart 58. A bar 60 is coupled to the conduit 12. The bar 60 is positioned proximate the medial opening 26 extending across the medial opening 26 wherein the bar 60 prevents the loop 38 from being pulled into the conduit 12 beyond the bar 60 so that the loop 38 remains accessible prior to coupling the loop 38 to the connector 44.

In use, the loop 38 is coupled to the connector 44 of the scooter 46 and each hook 54 is coupled to the basket 56. The scooter 46 may then be moved around and the device 10 will move the cart 58 with the scooter 46. Thus, the device 10 allows a person to use their own personal scooter with a conventional shopping cart.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A scooter and cart connection device comprising:
   a conduit having a first opening, a second opening, and a medial opening;
   a cord extending through said conduit, said cord having a first end extending from said first opening, a second end extending from said second opening, a medial section of said cord extending from said medial opening defining a loop;
   a pin coupled to said conduit, said pin being positionable to extend through said loop wherein said cord is configured for being coupled to a connector extending from a scooter; and
   a pair of hooks, each of said hooks being coupled to an associated one of said first end of said cord and said second end of said cord wherein said first end of said cord and said second end of said cord are each configured for being coupled to a basket of a cart.

2. The device of claim 1, further comprising said first opening being aligned with said second opening.

3. The device of claim 2, further comprising said medial opening transverse relative to said first opening and said second opening.

4. The device of claim 1, further comprising said conduit having a straight section and an extension section, said extension section being transverse relative to said straight section, said extension section being straight wherein said conduit is substantially T-shaped, said medial opening being positioned at a distal end of said extension section relative to said straight section.

5. The device of claim 4, further comprising said extension section being centrally positioned between said first opening and said second opening.

6. The device of claim 1, further comprising a bar coupled to said conduit, said bar being positioned proximate said medial opening, said bar extending across said medial opening wherein said bar prevents said loop from being pulled into said conduit beyond said bar.

7. The device of claim 1, further comprising a tether having a first end coupled to said conduit proximate said medial opening, said tether having a second end coupled to said pin.

8. The device of claim 1, further comprising said cord being resilient along a length of said cord.

9. The device of claim 1, further comprising said cord having a pair of parallel flat surfaces.

10. A scooter and cart connection device comprising:
    a conduit having a straight section and an extension section, said extension section being transverse relative to said straight section, said extension section being straight wherein said conduit is substantially T-shaped, said conduit having a first opening, a second opening, and a medial opening, said first opening being aligned with said second opening, said medial opening transverse relative to said first opening and said second opening, said medial opening being positioned at a distal end of said extension section relative to said straight section, said extension section being centrally positioned between said first opening and said second opening;
    a cord extending through said conduit, said cord having a first end extending from said first opening, a second end extending from said second opening, a medial section of said cord extending from said medial opening defining a loop, said cord being resilient along a length of said cord, said cord having a pair of parallel flat surfaces;
    a pin coupled to said conduit, said pin being positionable to extend through said loop wherein said cord is configured for being coupled to a connector extending from a scooter;
    a tether having a first end coupled to said conduit proximate said medial opening, said tether having a second end coupled to said pin;
    a pair of hooks, each of said hooks being coupled to an associated one of said first end of said cord and said second end of said cord wherein said first end of said cord and said second end of said cord are each configured for being coupled to a basket of a cart; and
    a bar coupled to said conduit, said bar being positioned proximate said medial opening, said bar extending across said medial opening wherein said bar prevents said loop from being pulled into said conduit beyond said bar.

* * * * *